(12) United States Patent
Kwa

(10) Patent No.: US 10,269,322 B2
(45) Date of Patent: Apr. 23, 2019

(54) POWER CONSERVATION TECHNIQUES FOR FOLDABLE DISPLAYS

(71) Applicant: INTEL CORPORATION, Santa Clara, CA (US)

(72) Inventor: Seh Kwa, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 15/183,590

(22) Filed: Jun. 15, 2016

(65) Prior Publication Data

US 2017/0365229 A1 Dec. 21, 2017

(51) Int. Cl.
*G09G 5/00* (2006.01)
*G06F 3/14* (2006.01)
*G06F 3/147* (2006.01)

(52) U.S. Cl.
CPC ............. *G09G 5/003* (2013.01); *G06F 3/147* (2013.01); *G06F 3/1446* (2013.01); *G09G 2310/08* (2013.01); *G09G 2330/021* (2013.01); *G09G 2330/023* (2013.01); *G09G 2354/00* (2013.01); *G09G 2370/02* (2013.01); *G09G 2370/04* (2013.01); *G09G 2370/08* (2013.01); *G09G 2380/02* (2013.01)

(58) Field of Classification Search
CPC .... G09G 5/003–5/006; G09G 2310/04; G09G 2310/08; G09G 2330/02–2330/023; G09G 2354/00; G09G 2370/02–2370/047; G09G 2380/02; G06F 3/14; G06F 3/1423–3/1446; G06F 3/147
See application file for complete search history.

(56) References Cited

U.S. PATENT DOCUMENTS

| | | | | |
|---|---|---|---|---|
| 2010/0141633 A1* | 6/2010 | Goder | ...................... | G09G 3/20 345/212 |
| 2011/0298812 A1* | 12/2011 | Liu | ...................... | G09G 3/3611 345/502 |
| 2012/0057517 A1* | 3/2012 | Kambhatla | ........... | G06F 3/1423 370/315 |
| 2015/0022561 A1* | 1/2015 | Ikeda | .................... | G06F 1/1652 345/690 |

* cited by examiner

*Primary Examiner* — Nathan Danielsen

(57) ABSTRACT

Power conservation techniques for foldable displays are described. In one embodiment, for example, an apparatus may comprise at least one memory and logic, at least a portion of which is implemented in circuitry coupled to the memory, the logic to identify a use state of a display segment of a flexible display, determine whether to alter a power state of the display segment based on the use state of the display segment, and in response to a determination to alter the power state of the display segment, send a power control command to cause the display segment to initiate a power state transition. Other embodiments are described and claimed.

16 Claims, 14 Drawing Sheets

FIG. 11
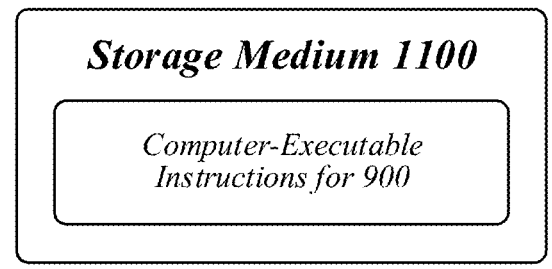
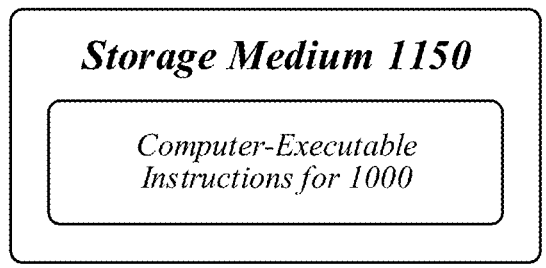

POWER CONSERVATION TECHNIQUES FOR FOLDABLE DISPLAYS

TECHNICAL FIELD

Embodiments herein generally relate to electronic displays and electronic devices comprising such displays.

BACKGROUND

Foldable displays are an emerging area of interest in the field of electronic display technology. According to one potential application, display foldability may be leveraged to support multiple usage modes for a consumer electronic device. For example, a device featuring a foldable display may be designed such that a user can transition the device from one usage mode to another usage mode by folding some portions of the foldable display behind other portions of the foldable display.

BRIEF DESCRIPTION OF THE DRAWINGS

FIG. 11 illustrates an embodiment of a first storage medium and an embodiment of a second storage medium.

DETAILED DESCRIPTION

Various embodiments may be generally directed to power conservation techniques for foldable displays. In one embodiment, for example, an apparatus may comprise at least one memory and logic, at least a portion of which is implemented in circuitry coupled to the memory, the logic to identify a use state of a display segment of a flexible display, determine whether to alter a power state of the display segment based on the use state of the display segment, and in response to a determination to alter the power state of the display segment, send a power control command to cause the display segment to initiate a power state transition. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
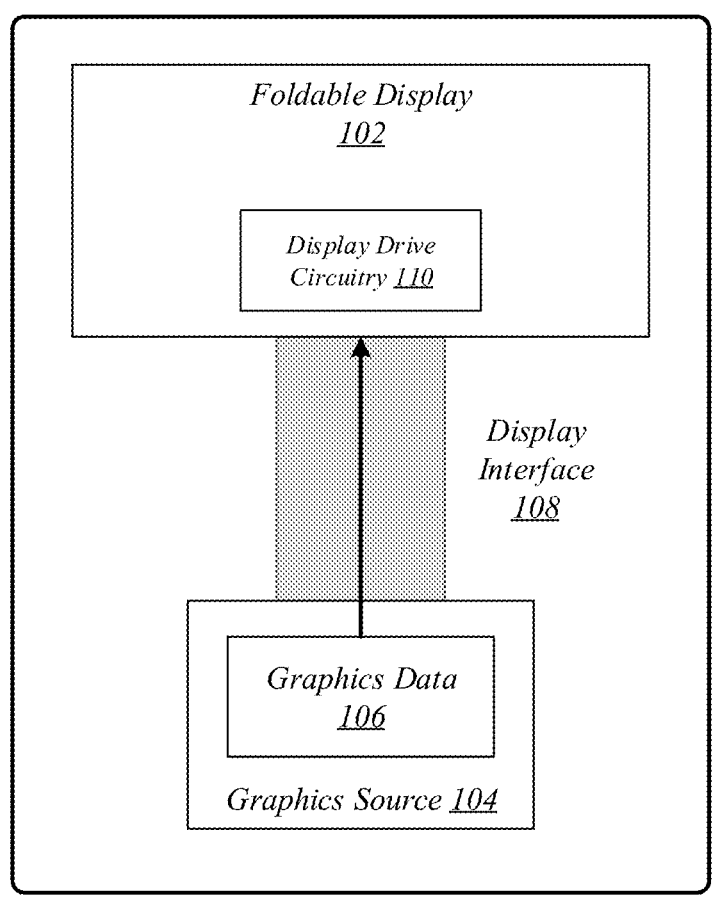
FIG. 1 illustrates an embodiment of a first apparatus.

FIG. 1 illustrates an example of an apparatus 100. As shown in FIG. 1, apparatus 100 comprises a foldable display 102 and a graphics source 104. Foldable display 102 may generally comprise an electronic display that is flexible or otherwise capable of being folded without being damaged. In various embodiments, foldable display 102 may comprise an organic light-emitting diode (OLED) display. Graphics source 104 may generally comprise circuitry operative to generate graphics data 106 for transmission to foldable display 102. Such graphics data 106 may be operative on display drive circuitry 110 of foldable display 102 to cause the presentation of visual content on foldable display 102. In some embodiments, graphics source 104 may generate graphics data 106 for transmission to foldable display 102 via a display interface 108. In various embodiments, display interface 108 may comprise an Embedded DisplayPort (eDP) interface. In some embodiments, graphics source 104 may comprise a system-on-a-chip (SoC). In various embodiments, graphics source 104 may comprise a graphics processing unit (GPU), or another type of dedicated graphics processing circuitry. The embodiments are not limited to these examples.

Figure 2:
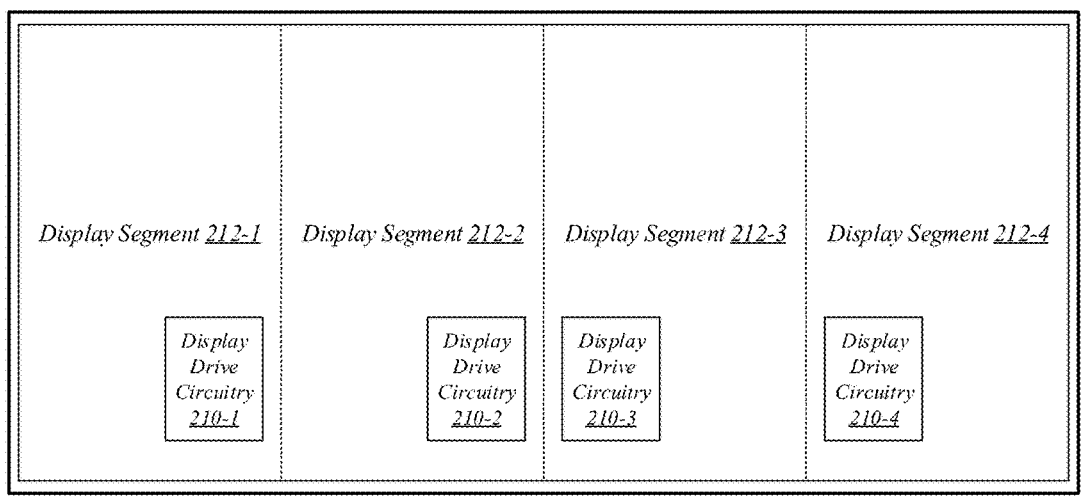
FIG. 2 illustrates an embodiment of a foldable display.

FIG. 2 illustrates a foldable display 200. Foldable display 200 may be representative of an example of a foldable display that may be used to implement foldable display 102 of FIG. 1 according to some embodiments. As shown in FIG. 2, foldable display 200 may comprises display segments 212-1, 212-2, 212-3, and 212-4. In various embodiments, each such display segment may comprise a display panel. Display segments 212-1, 212-2, 212-3, and 212-4 are driven by respective display drive circuitry 214-1, 214-2, 214-3, and 214-4. It is worthy of note that in some embodiments, foldable display 200 may comprise a greater or lesser number of display segments than the four depicted in FIG. 2, and the embodiments are not limited to this example.

Figure 3:
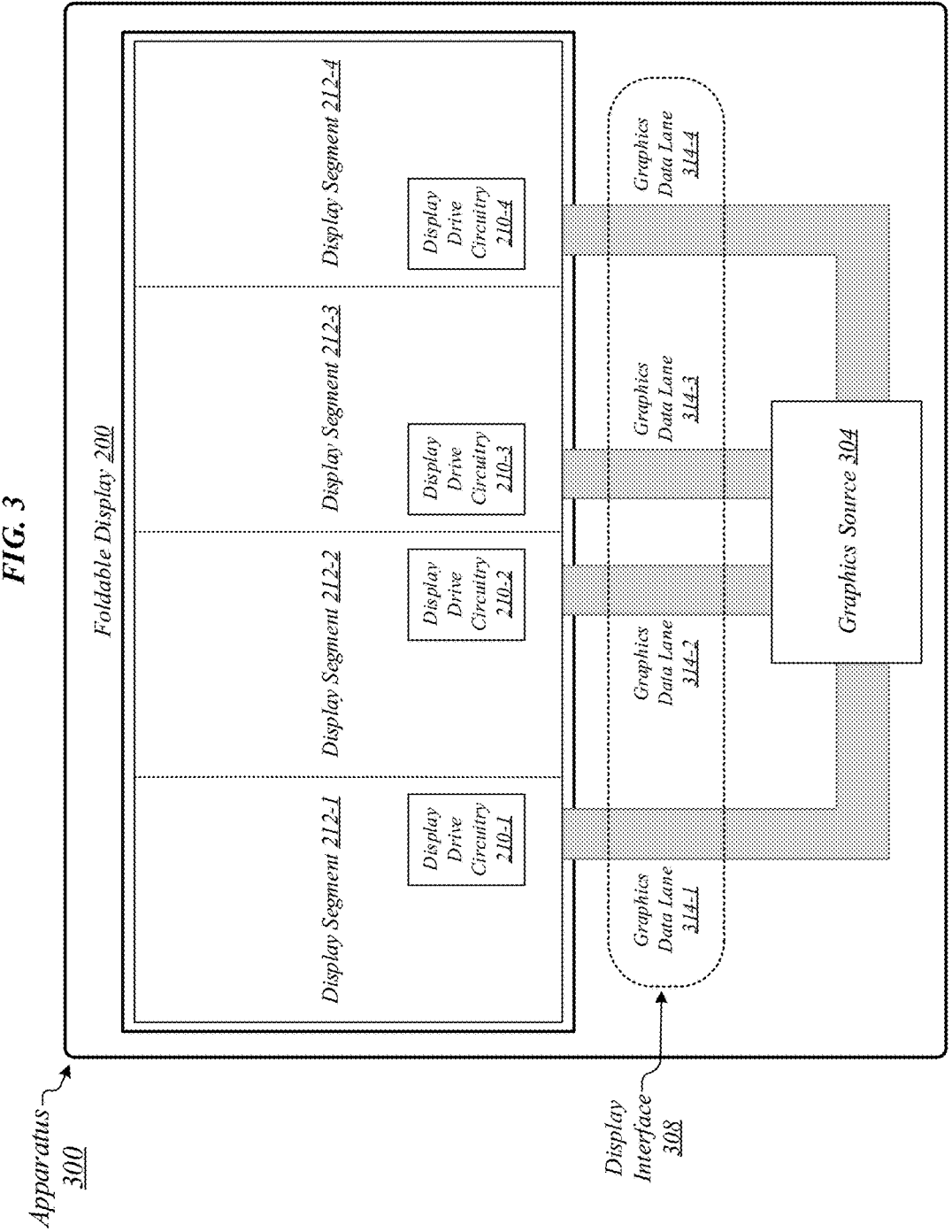
FIG. 3 illustrates an embodiment of a second apparatus.

FIG. 3 illustrates an apparatus 300 that may comprise an example of an implementation of apparatus 100 of FIG. 1 using foldable display 200 of FIG. 2 according to various embodiments. In apparatus 300, a graphics source 304 is communicatively coupled to foldable display 200 via a display interface 308. Display interface 308 provides multiple graphics data lanes via which graphics source 304 can communicate graphics data to foldable display 200. In this non-limiting example, display interface 108 provides four graphics data lanes 216-1, 216-2, 216-3, and 216-4. Each one of graphics data lanes 216-1, 216-2, 216-3, and 216-4 can be used to send graphics data to a particular respective one of display segments 212-1, 212-2, 212-3, and 212-4. For example, graphics data lane 314-1 can be used to send graphics data to display drive circuitry 210-1 of display segment 212-1, graphics data lane 314-2 can be used to send graphics data to display drive circuitry 210-2 of display segment 212-2, and so forth. In some embodiments, display interface 308 may comprise an eDP interface, and a Multi-Single Stream Transport Operation (MSO) feature may be implemented in order to enable graphics data lanes 216-1, 216-2, 216-3, and 216-4 to serve individual display segments. It is worthy of note that although apparatus 300 uses one graphics data lane for each display segment, the embodiments are not limited to this example. In various embodiments, multiple graphics data lanes may be arranged to route graphics data to a same display segment of a given foldable display. For example, in some embodiments, the MSO feature may be implemented in order to allocate two different pairs of graphics data lanes of an eDP interface to two display segments of a foldable display. The embodiments are not limited to this example.

Figure 4:
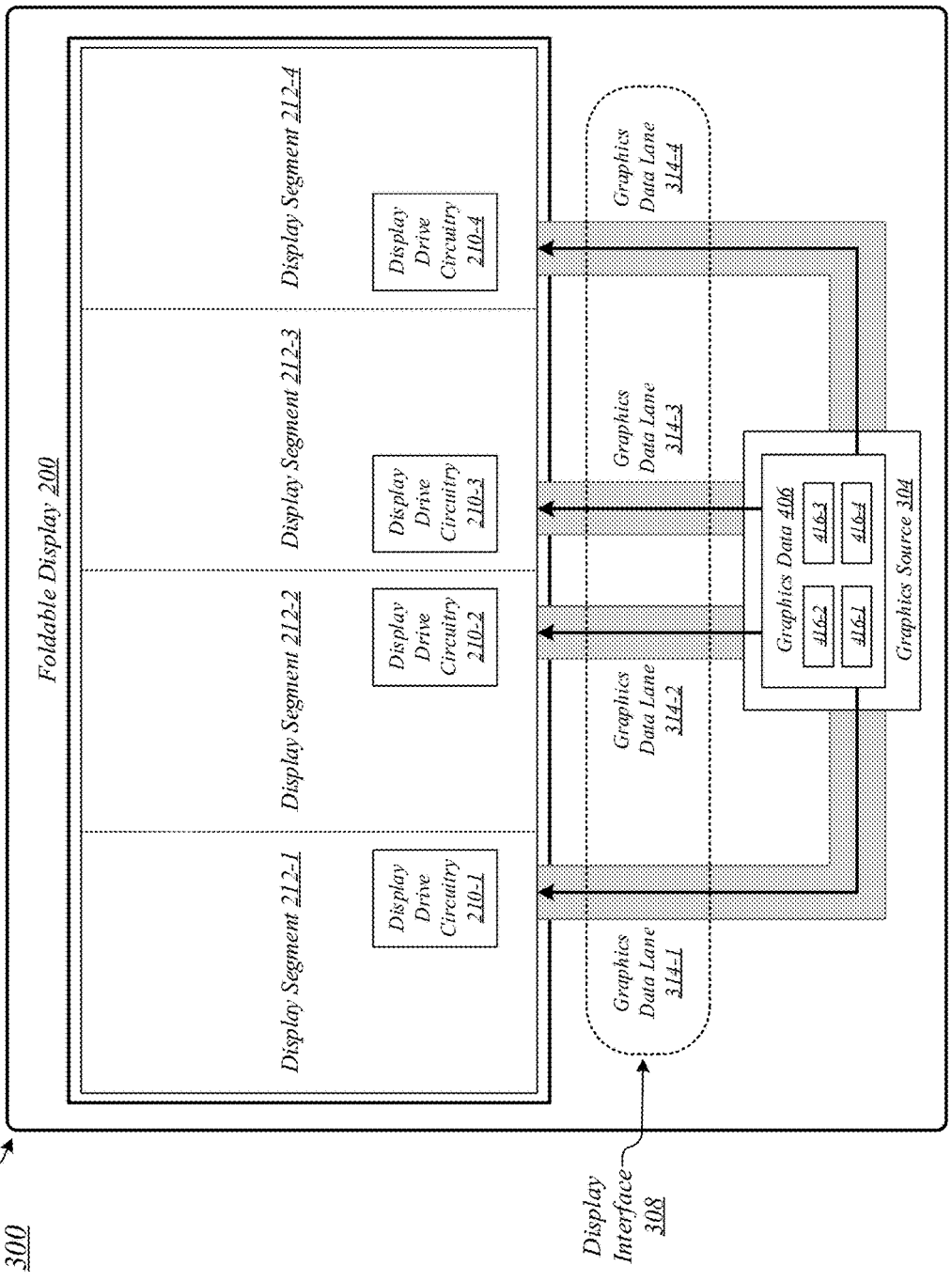
FIG. 4 illustrates an embodiment of a first operating environment.

FIG. 4 illustrates an operating environment 400 that may be representative of the operation of apparatus 300 of FIG. 3 in various embodiments. For example, operating environment 400 may be representative of some embodiments in which display interface 308 is an eDP interface utilizing the MSO feature. As shown in FIG. 4, in operating environment 400, graphics source 304 may be operative to generate graphics data 406 for transmission to foldable display 200. Graphics data 406 may include graphics data 416-1, 416-2, 416-3, and 416-4, each of which may comprise graphics data operative to drive a respective one of display segments 212-1, 212-2, 212-3, and 212-4 in order to cause presentation of visual content on that display segment. In operating environment 400, graphics source 304 may be operative to transmit all of graphics data 406 over each of graphics data lanes 314-1, 314-2, 314-3, and 314-4. At each one of display segments 212-1, 212-2, 212-3, and 212-4, the respective display drive circuitry may drive its corresponding display segment based on the portion of graphics data 406 that is directed to that display segment, and discard the rest. For example, display drive circuitry 210-1 may drive display segment 212-1 based on graphics data 416-1, and discard graphics data 416-2, 416-3, and 416-4. The embodiments are not limited to this example.

Figure 5:
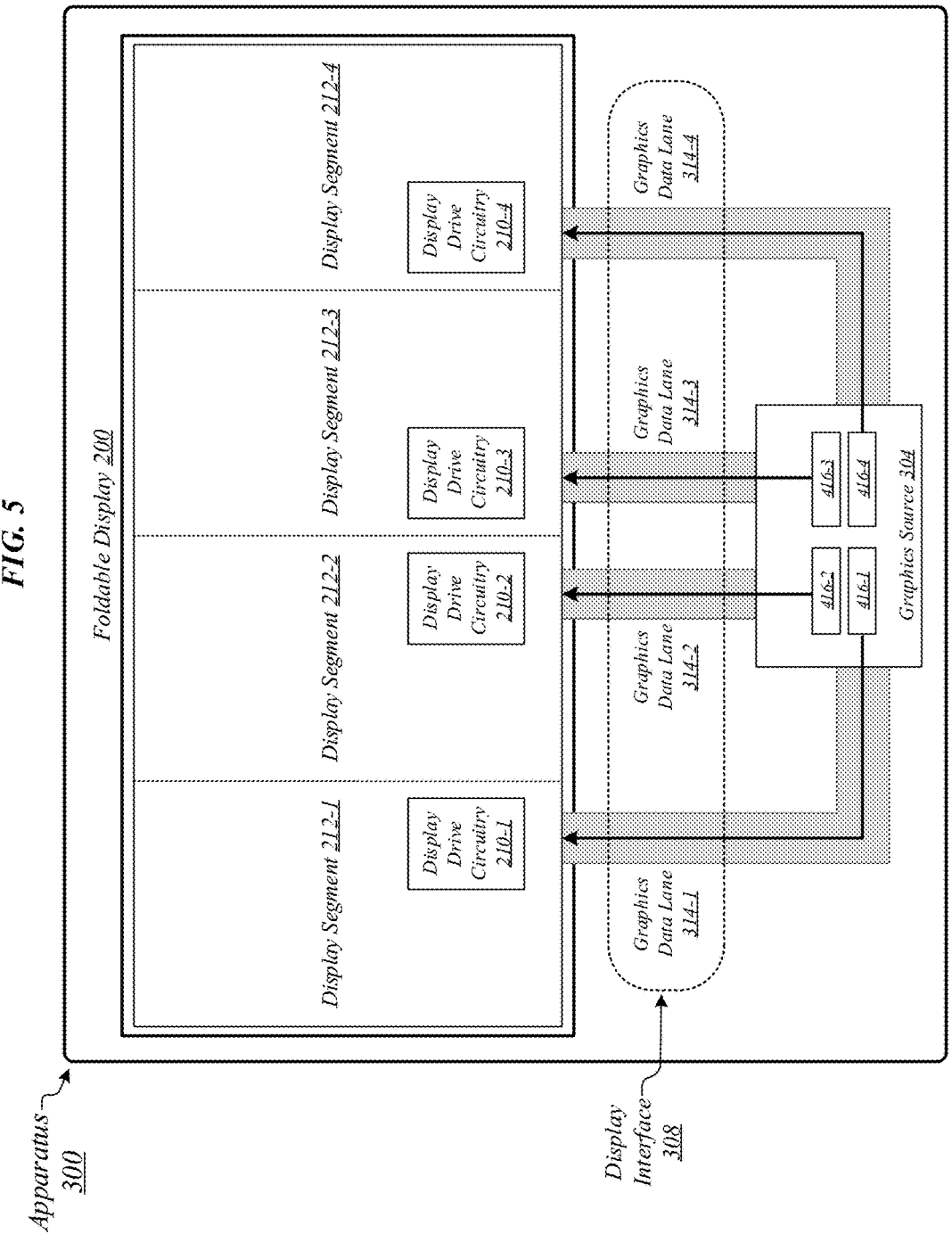
FIG. 5 illustrates an embodiment of a second operating environment.

FIG. 5 illustrates an operating environment 500 that may be representative of the operation of apparatus 300 of FIG. 3 in various embodiments. In operating environment 500, graphics source 304 may be operative to generate the same portions of graphics data 416-1, 416-2, 416-3, and 416-4 as in operating environment 400 of FIG. 4. However, in operating environment 500, graphics source 304 may be configured to transmit each such portion of graphics data only over a particular graphics data lane that directs it to the display segment for which it is intended. For example, graphics source 304 may transmit graphics data 416-1 to display segment 212-1 via graphics data lane 314-1, may transmit graphics data 416-2 to display segment 212-2 via graphics data lane 314-2, and so forth. According to some embodiments, operating environment 500 may be representative of the implementation of an enhanced MSO feature for a display interface 308 that comprises an eDP interface. In various such embodiments, the implementation of the enhanced MSO feature may enable lane level alignment and/or control of display segments of foldable display 200. The embodiments are not limited in this context.

At a given instance upon which foldable display 200 is folded, one or more of display segments 212-1 to 212-4 may become obscured, and may not be useful for the purpose of displaying visual content while foldable display 200 remains in the folded state. In some embodiments, in the interest of power conservation, it may be desirable that such display segments be powered down while they remain obscured. According to various power conservation techniques described herein, lane-level controllability of the electronics in a foldable display such as foldable display 200 may be provided in such fashion as to enable segment-level power control. According to some such techniques, each segment of such a foldable display may be connected with lane-level granularity to a sensory mechanism configured to provide a graphics source such as graphics source 304 with notification of folded segments. The embodiments are not limited in this context.

Figure 6:
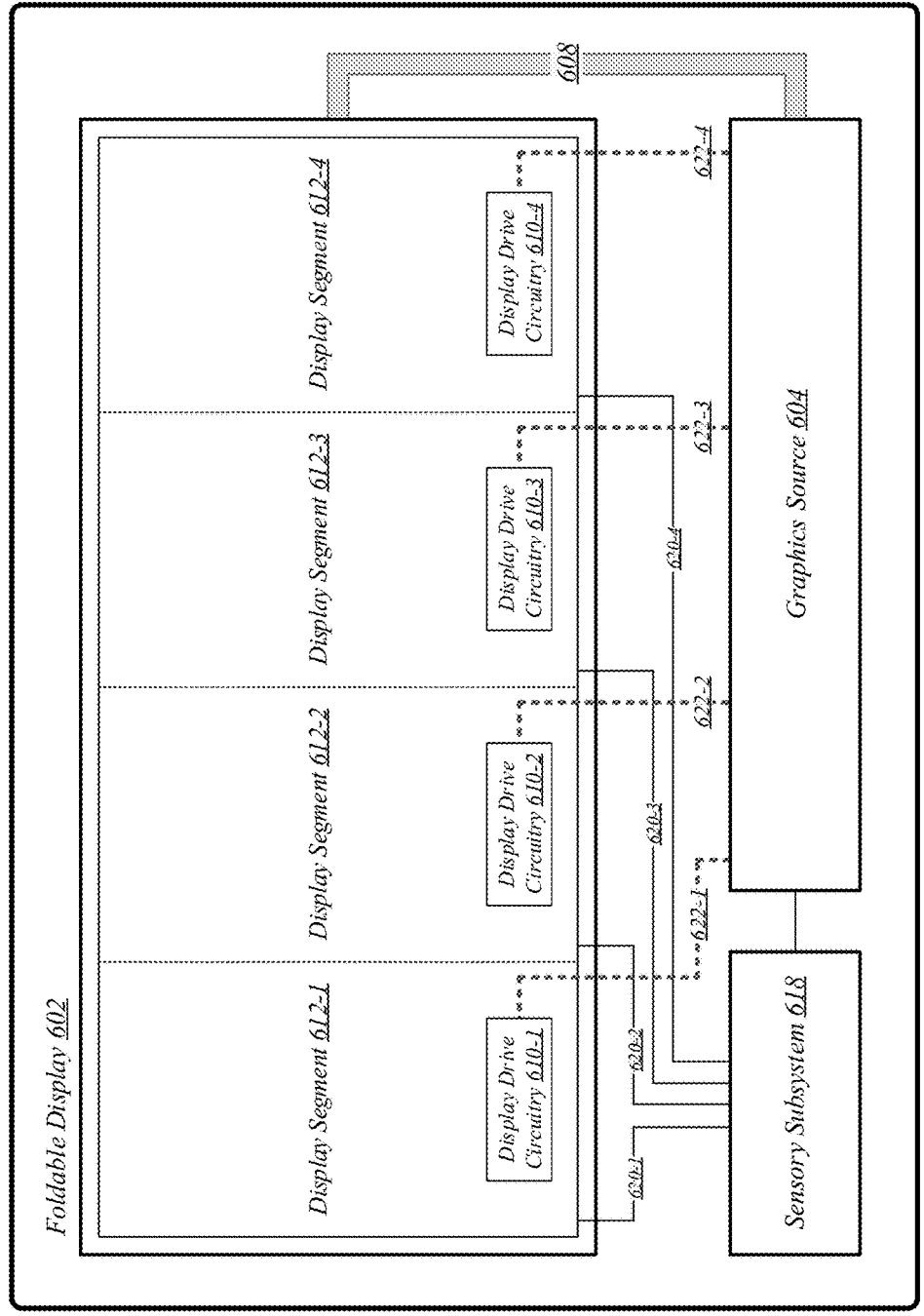
FIG. 6 illustrates an embodiment of a third apparatus.

FIG. 6 illustrates an apparatus 600 that may be representative of a device configurable to implement one or more of the disclosed power conservation techniques according to various embodiments. As shown in FIG. 6, apparatus 600 may comprise a foldable display 602, a graphics source 604, and a sensory subsystem 618. Foldable display 602 may generally comprise an electronic display that is flexible or otherwise capable of being folded without being damaged. In some embodiments, foldable display 602 may comprise an organic light-emitting diode OLED display. In various embodiments, foldable display 602 may comprise display segments 612-1, 612-2, 612-3, and 612-4. In some embodiments, each such display segment may comprise a display panel. In various embodiments, display segments 612-1, 612-2, 612-3, and 612-4 may be driven by respective display drive circuitry 614-1, 614-2, 614-3, and 614-4. In some embodiments, each of display drive circuitry 614-1, 614-2, 614-3, and 614-4 may comprise a respective TCON for its corresponding display segment. In various embodiments, each of display drive circuitry 614-1, 614-2, 614-3, and 614-4 may comprise a respective TCON featuring integrated column drivers. In some embodiments, each of display drive circuitry 614-1, 614-2, 614-3, and 614-4 may include respective pixel format circuitry. The embodiments are not limited in this context.

Graphics source 604 may generally comprise circuitry operative to generate graphics data for transmission to foldable display 602, and such graphics data may be operative on display drive circuitry of foldable display 602 to cause the presentation of visual content on foldable display 602. In various embodiments, graphics source 604 may comprise an SoC. In some embodiments, graphics source 604 may comprise a GPU, or another type of dedicated graphics processing circuitry or graphics engine. In various embodiments, graphics source 604 may generate graphics data for transmission to foldable display 602 via a display interface 608. In some embodiments, display interface 608 may provide a plurality of graphics data lanes via which graphics source 604 can communicate graphics data to foldable display 602. For example, in various embodiments, display interface 608 may comprise an eDP interface.

In some embodiments in which display interface 608 provides a plurality of graphics data lanes, each graphics data lane may be used to provide graphics data to a particular respective display segment. For example, in various embodiments in which display interface 608 comprises an eDP interface, an MSO feature may be implemented in order to enable graphics data lanes of display interface 608 to serve individual display segments. In some embodiments in which each graphics data lane is used to provide graphics data to a particular respective display segment, graphics source 604 and display drive circuitry 610-1, 610-2, 610-3, and 610-4 may be configured such that any given graphics data lane is used to carry only graphics data that is intended for the display segment associated with that graphics data lane. For example, in various embodiments in which display interface 608 comprises an eDP interface, an enhanced MSO feature may be implemented, such as the enhanced MSO feature discussed above in reference to FIG. 5. It is to be appreciated that the embodiments are not limited to implementations featuring eDP interfaces, and that display interface 608 may comprise another type of display interface in some embodiments. For example, in some embodiments, display interface 608 may comprise a Mobile Industry Processor Interface (MIPI) Display Serial Interface (DSI) interface. The embodiments are not limited in this context.

Sensory subsystem 618 may generally comprise circuitry operative to sense the positions and/or orientations of one or more of display segments 612-1 to 612-4 and to generate sense signals for provision to graphics source 604 in order to enable graphics source 604 to identify any unused display segments. As employed herein, the term "unused display segment" generally refers to a display segment that is obscured or otherwise positioned and/or oriented in such fashion that it is not currently useful for the purpose of displaying visual content for user consumption, and the term "used display segment" refers to a display segment that is not an unused display segment. For example, if display segments 612-1 and 612-4 are folded behind display segments 612-2 and 612-3, then display segments 612-1 and 612-4 may constitute unused display segments and display segments 612-2 and 612-3 may constitute used display segments. In such a case, sense signals provided by sensory subsystem 618 may enable graphics source 604 to detect that display segments 612-1 and 612-4 have been folded behind display segments 612-2 and 612-3, and thus identify display segments 612-1 and 612-4 as unused display segments. The embodiments are not limited to this example.

In various embodiments, sensory subsystem 618 may be configured to sense the positions and/or orientations of each of display segments 612-1 to 612-4, via respective sense connections 620-1 to 620-4. In some other embodiments, sensory subsystem 618 may only be configured to sense the positions and/or orientations of a subset of display segments 612-1 to 612-4. For example, in various embodiments, sensory subsystem 618 may be configured to sense the positions and/or orientations of display segments 612-1 and 612-4, but not those of display segments 612-2 and 612-3. The embodiments are not limited to this example.

In some embodiments, apparatus 600 may be configured in such fashion as to provide graphics source 604 with power control of display segments 612-1 to 612-4 via respective power control interfaces 622-1 to 622-4. Power control interfaces 622-1, 622-2, 622-3, and 622-4 may generally comprise mechanisms that are usable by graphics source 604 to control power states of display segments 612-1, 612-2, 612-3, and 612-4, respectively. In various embodiments, graphics source 604 may be able to use any given one of power control interfaces 622-1 to 622-4 to send signals to cause a corresponding one of display segments 612-1 to 612-4 to transition from a standard-power operating state to a reduced-power operating state, or from the reduced-power operating state to a standard-power operating state. In some embodiments, while a given display segment is in the reduced-power operating state, some or all of the display drive circuitry for that display segment may be powered down or otherwise power-managed in such fashion as to reduce power consumption relative to that of the standard-power operating state. In various embodiments, graphics source 604 may be configured to respond to a determination that a previously used display segment has become an unused display segment by sending a signal via a power control interface to cause that display segment to transition to a reduced-power operating state. In some embodiments, graphics source 604 may be configured to respond to a determination that a previously unused display segment has become a used display segment by sending a signal via a power control interface to cause that display segment to transition from a reduced-power operating state to a standard-power operating state. The embodiments are not limited in this context.

For illustrative purposes, power control interfaces 622-1 to 622-4 are depicted in FIG. 6 as distinct dotted lines connecting graphics source 604 to display drive circuitry 610-1 to 610-4, respectively. However, this depiction is intended only to illustrate power control interfaces 622-1 to 622-4 on a logical level, and is not intended to indicate that power control interfaces 622-1 to 622-4 need necessarily comprise dedicated physical connections between graphics source 604 and display drive circuitry 610-1 to 610-4. In general, power control interfaces 622-1 to 622-4 may be implemented by configuring graphics source 604 to issue power control commands by sending particular signals or information to power control interfaces 622-1 to 622-4 using some type of physical connectivity and configuring display drive circuitry 610-1 to 610-4 to respond appropriately to such signals or information. In various embodiments, power control interfaces 622-1 to 622-4 may be implemented using physical connectivity provided by display interface 608. In some other embodiments, power control interfaces 622-1 to 622-4 may be implemented using physical connectivity other than that provided by display interface 608. The embodiments are not limited in this context.

It is worthy of note that the physical connectivity used to implement power control interfaces 622-1 to 622-4 need not necessarily constitute direct connectivity between graphics source 604 and display drive circuitry 610-1 to 610-4. As such, in various embodiments, signals or information sent over power control interfaces 622-1 to 622-4 may pass to display drive circuitry 610-1 to 610-4 via one or more intermediate components or elements. It is also worthy of note that in some embodiments, physical connectivity that is used to implement power control interfaces 622-1 to 622-4 in order to enable segment-level power control may also be used to enable segment-level control of one or more other types of operations, parameters or characteristics of display segments 612-1 to 612-4. For example, in various embodiments, physical connectivity that is used to implement power control interfaces 622-1 to 622-4 may also be used to implement a scheme for providing graphics source 604 with the ability to independently control OLED compensation operations of each of display segments 612-1 to 612-4. The embodiments are not limited in this context.

In some embodiments, power control interfaces 622-1 to 622-4 may be implemented using physical connectivity provided by display interface 608, and thus graphics source 604 may issue power control commands by sending them over display interface 608. In various embodiments, graphics source 604 may issue power control commands by including them in packets that it sends over display interface 608. In some embodiments, graphics source 604 may send such packets during vertical blanking intervals. In various embodiments in which display interface 608 comprises an eDP interface, graphics source 604 may issue power control commands by including them in secondary data packets (SDPs) that it sends over display interface 608. In some embodiments, communications over display interface 608 may involve differential signaling, and graphics source 604 may send power control commands by intentionally violating an electrical signaling protocol for differential signaling over display interface 608. For example, in various embodiments, graphics source 604 may send a power control command by setting both signals of a differential signal pair to a same polarity. In some embodiments, graphics source 604 may send power control commands by intentionally violating an encoding protocol for the encoding of graphics data to be communicated over display interface 608. For example, in various embodiments, graphics source 604 may send a power control command by inserting symbols into a symbol stream to intentionally violate an 8b/10b encoding protocol. In some embodiments, rather than issuing power control commands using in-band signaling over display interface 608, graphics source 604 may issue power control commands using sideband signaling via some other form of physical connectivity. In various embodiments, for example, power control interfaces 622-1 to 622-4 by communicatively coupling general purpose input/output (GPIO) pins of graphics source 604 with GPIO pins of display drive circuitry 610-1 to 610-4, and graphics source 604 may issue power control commands using GPIO signaling. The embodiments are not limited in this context.

Figure 7:
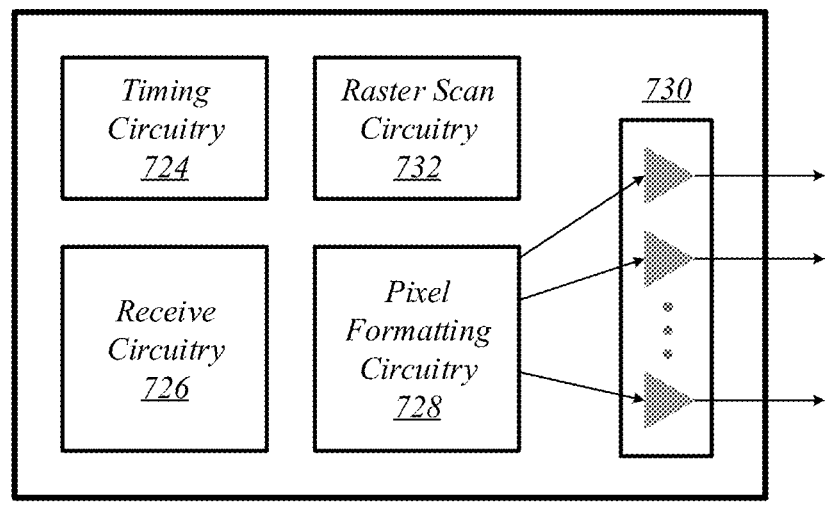
FIG. 7 illustrates an embodiment of a fourth apparatus.

FIG. 7 illustrates an apparatus 700 that may be representative of any of display drive circuitry 610-1 to 610-4 according to some embodiments. As shown in FIG. 7, apparatus 700 may comprise timing circuitry 724, receive circuitry 726, pixel formatting circuitry 728, integrated column driver circuitry 730, and raster scan circuitry 732. Timing circuitry 724 may generally comprise circuitry operative to generate timing signals for use in controlling the timing of display driving operations of apparatus 700. In various embodiments, timing circuitry 724 may comprise a phase-locked loop (PLL). Receive circuitry 726 may generally comprise circuitry operative to process and/or decode received signals, such as received signals comprising graphics data. Pixel formatting circuitry 728 may generally comprise circuitry operative to perform pixel-specific color tuning for pixels of a display segment. Integrated column driver circuitry 730 may generally comprise circuitry operative to convert digital pixel color values received from pixel formatting circuitry 728 into corresponding analog values to be used to drive the display segment. Raster scan circuitry 732 may generally comprise circuitry operative to manage raster scanning for the display segment. It is to be appreciated that in some embodiments, apparatus 700 may comprise one or more other components in addition to—or rather than—any of the components depicted in FIG. 7. The embodiments are not limited in this context.

Figure 8:
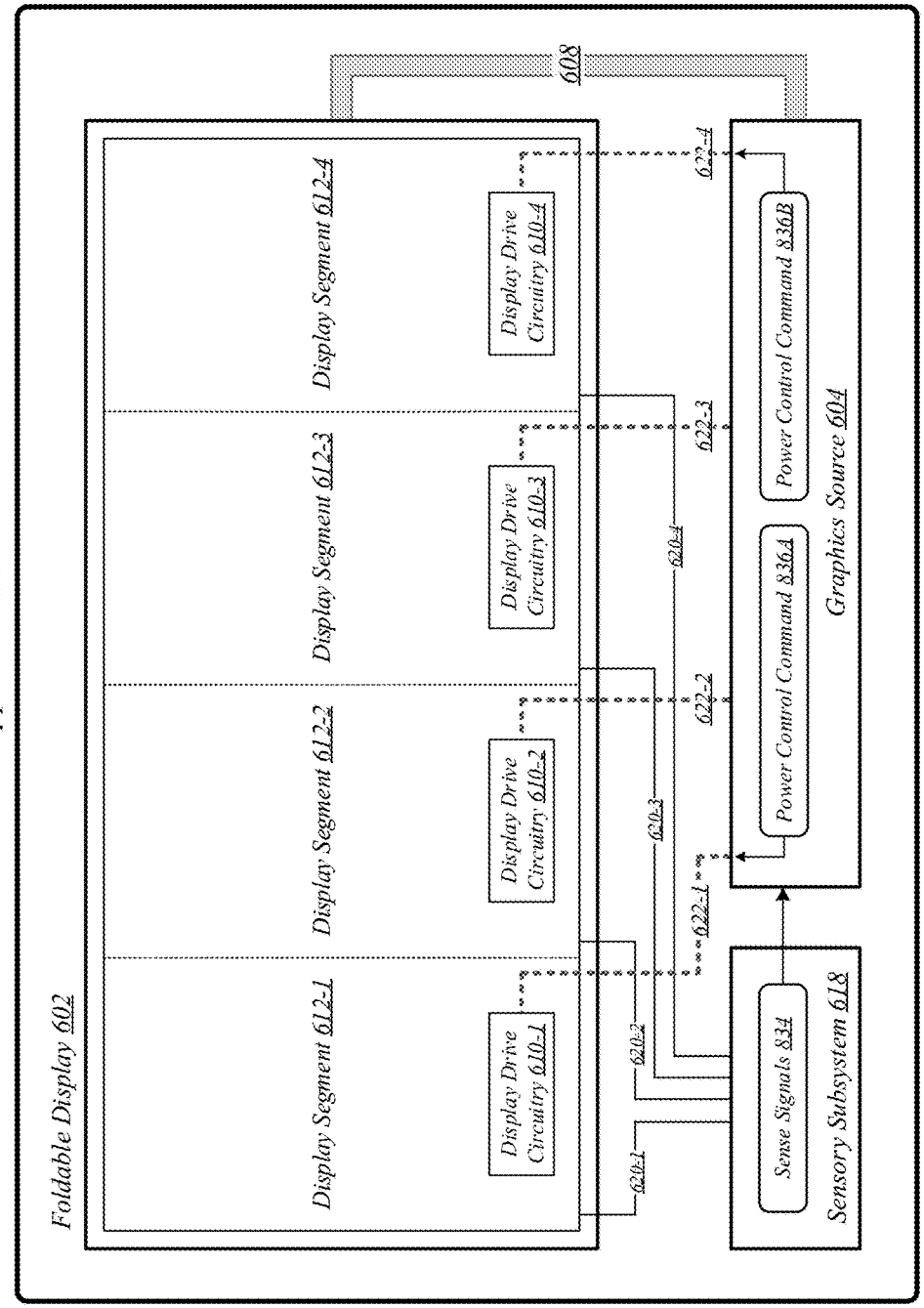
FIG. 8 illustrates an embodiment of a third operating environment.

FIG. 8 illustrates an operating environment 800 that may be representative of the implementation of one or more of the disclosed power conservation techniques according to various embodiments. As shown in FIG. 8, in operating environment 800, sensory subsystem 618 may send sense signals 834 to graphics source 604. Sense signals 834 may generally comprise signals that convey descriptive information regarding the positions and/or orientations of one or more of display segments 612-1 to 612-4. In some embodiments, graphics source 604 may be operative to analyze sense signals 834 in order to identify current use states of some or all of display segments 612-1 to 612-4 and determine whether the use state of any display segment has changed. In various embodiments, graphics source 604 may be operative to determine whether/how to alter a power state of a given display segment based on whether its use state has changed. In some embodiments, in response to a determination that the use state of a given display segment has not changed, graphics source 604 may be operative to determine not to alter the power state of that display segment. In various embodiments, in response to a determination that the use state of a given display segment has changed, graphics source 604 may be operative to determine to alter the power state of that display segment.

In some embodiments, in response to a determination to alter the power state of a given display segment, graphics source 604 may be operative to send a power control command to cause that display segment to initiate a power state transition. In various embodiments, the nature of the power state transition may depend on the nature of the change in the use state of the given display segment. In some embodiments, in response to a determination that the use state of a given display segment has changed from a used state to an unused state, graphics source 604 may be operative to send a power control command to cause that display segment to transition from a standard-power operating state to a reduced-power operating state. In an example embodiment, graphics source 604 may detect, based on sense signals 834, that display segment 612-1 has been folded behind display segment 612-2, and thus that the use state of display segment 612-1 has changed from a used state to an unused state. In response to this determination, graphics source 604 may be operative to send a power control command 836A to cause display segment 612-1 to transition from a standard-power operating state to a reduced-power operating state. In various embodiments, in response to a determination that the use state of a given display segment has changed from an unused state to a used state, graphics source 604 may be operative to send a power control command to cause that display segment to transition from a reduced-power operating state to a standard-power operating state. In an example embodiment, graphics source 604 may detect, based on sense signals 834, that display segment 612-4 has been unfolded from behind display segment 612-3, and thus that the use state of display segment 612-4 has changed from an unused state to a used state. In response to this determination, graphics source 604 may be operative to send a power control command 836B to cause display segment 612-4 to transition from a reduced-power operating state to a standard-power operating state. The embodiments are not limited to these examples.

In some embodiments, transitioning a given display segment to a reduced-power operating state may involve powering down one or more portions of the display drive circuitry for that display segment. In an example embodiment, while operating in a standard-power operating state, display drive circuitry 610-1 of display segment 612-1 may detect power control command 836A and initiate a transition to a reduced-power operating state. In conjunction with the transition to the reduced-power operating state, display drive circuitry 610-1 may be operative to power down one or more of timing circuitry such as timing circuitry 724 of FIG. 7, receive circuitry such as receive circuitry 726 of FIG. 7, pixel formatting circuitry such as pixel formatting circuitry 728 of FIG. 7, column driver circuitry such as integrated column driver circuitry 730 of FIG. 7, and raster scan circuitry such as raster scan circuitry 732 of FIG. 7. The embodiments are not limited to this example.

In various embodiments, transitioning a given display segment from a reduced-power operating state to a standard-power operating state may involve powering up one or more portions of the display drive circuitry for that display segment. In an example embodiment, while operating in a reduced-power operating state, display drive circuitry 610-4 of display segment 612-4 may detect power control command 836B and initiate a transition to a standard-power operating state. In conjunction with the transition to the standard-power operating state, display drive circuitry 610-4 may be operative to power up one or more of timing circuitry such as timing circuitry 724 of FIG. 7, receive circuitry such as receive circuitry 726 of FIG. 7, pixel formatting circuitry such as pixel formatting circuitry 728 of FIG. 7, column driver circuitry such as integrated column driver circuitry 730 of FIG. 7, and raster scan circuitry such as raster scan circuitry 732 of FIG. 7. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 9:
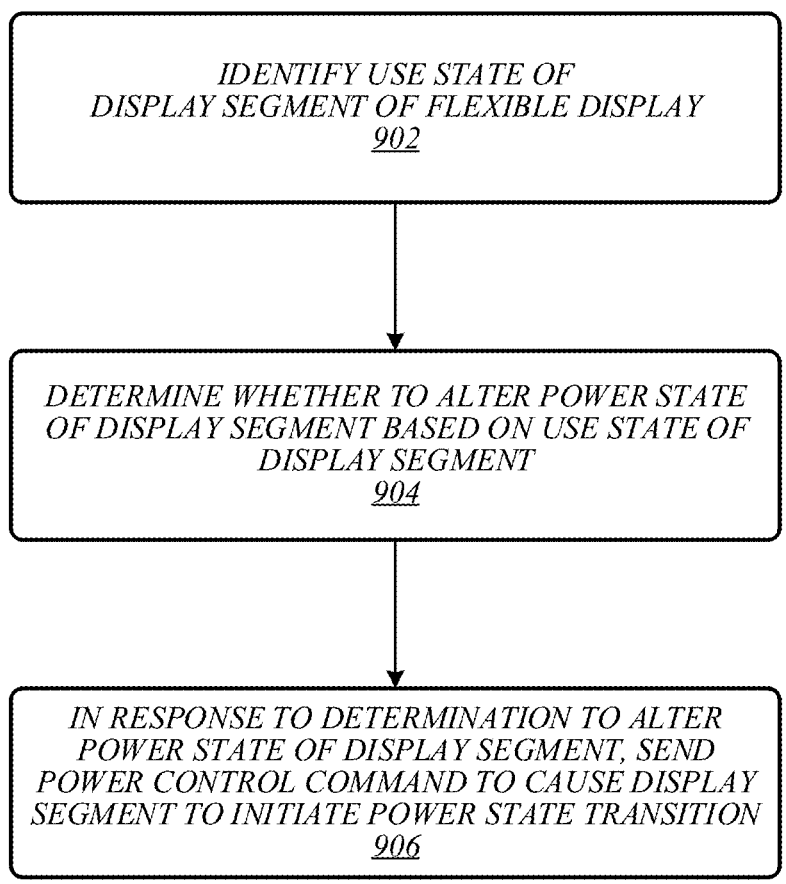
FIG. 9 illustrates an embodiment of a first logic flow.

FIG. 9 illustrates an example of a logic flow 900 that may be representative of one or more of the disclosed power conservation techniques according to various embodiments. For example, logic flow 900 may be representative of operations that may be performed by graphics source 604 in operating environment 800 of FIG. 8 according to some embodiments. As shown in FIG. 9, a use state of a display segment of a flexible display may be identified at 902. For example, in operating environment 800 of FIG. 8, graphics source 604 may identify a use state of display drive circuitry 610-1 based on received sense signals 834. At 904, based on the use state of the display segment, it may be determined whether to alter a power state of the display segment. For example, in operating environment 800 of FIG. 8, graphics source 604 may determine to alter a power state of display segment 612-1 based on a determination that the use state of display segment 612-1 has changed from a used state to an unused state. At 906, in response to a determination to alter the power state of the display segment, a power control command may be sent in order to cause the display segment to initiate a power state transition. For example, in operating environment 800 of FIG. 8, graphics source 604 may send power control command 836A in order to cause display segment 612-1 to initiate a power state transition according to which it transitions from a standard-power operating state to a reduced-power operating state. The embodiments are not limited to these examples.

Figure 10:
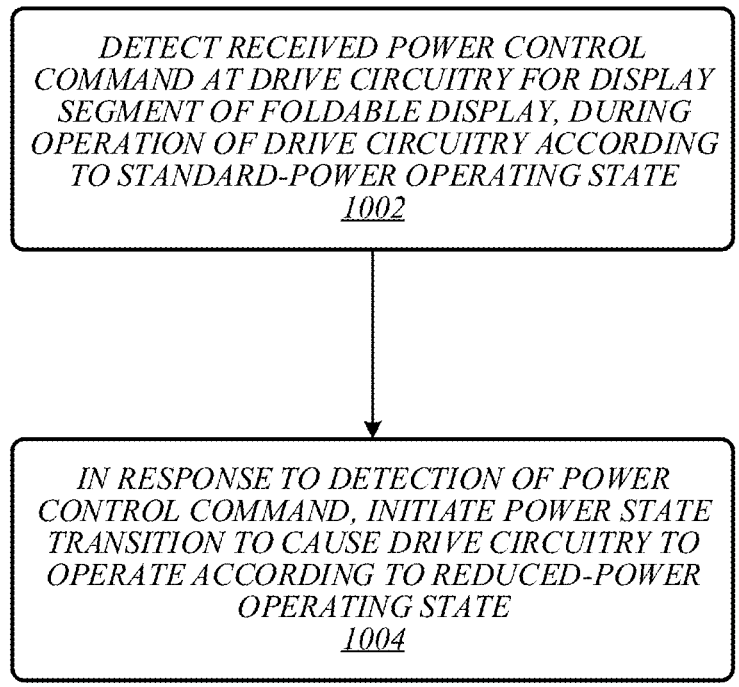
FIG. 10 illustrates an embodiment of a second logic flow.

FIG. 10 illustrates an example of a logic flow 1000 that may be representative of one or more of the disclosed power conservation techniques according to various embodiments. For example, logic flow 1000 may be representative of operations that may be performed by display drive circuitry 610-1 in operating environment 800 of FIG. 8 according to some embodiments. As shown in FIG. 10, at 1002, a received power control command may be detected at drive circuitry for a display segment of a foldable display, during operation of the drive circuitry according to a standard-power operating state. For example, in operating environment 800 of FIG. 8, display drive circuitry 610-1 may detect power control command 836A while operating according to a standard-power operating state. At 1004, in response to the detection of the power control command, a power state transition may be initiated in order to cause the drive circuitry to operate according to a reduced-power operating state. For example, in operating environment 800 of FIG. 8, in response to detecting power control command 836A, display drive circuitry 610-1 may initiate a power state transition, which may cause it to operate according to a reduced-power operating state. The embodiments are not limited to these examples.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The embodiments are not limited in this context.

FIG. 11 illustrates an embodiment of a storage medium 1100. Storage medium 1100 may comprise any computer-readable storage medium or machine-readable storage medium, such as an optical, magnetic or semiconductor storage medium. In some embodiments, storage medium 1100 may comprise a non-transitory storage medium. In various embodiments, storage medium 1100 may comprise an article of manufacture. In some embodiments, storage medium 1100 may store computer-executable instructions, such as computer-executable instructions to implement logic flow 900 of FIG. 9. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 11 also illustrates an embodiment of a storage medium 1150. Storage medium 1150 may comprise any computer-readable storage medium or machine-readable storage medium, such as an optical, magnetic or semiconductor storage medium. In some embodiments, storage medium 1150 may comprise a non-transitory storage medium. In various embodiments, storage medium 1150 may comprise an article of manufacture. In some embodiments, storage medium 1150 may store computer-executable instructions, such as computer-executable instructions to implement logic flow 1000 of FIG. 10. Examples of a computer-readable or machine-readable storage medium and of computer-executable instructions may include any of the respective examples mentioned above in reference to storage medium 1100. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 12:
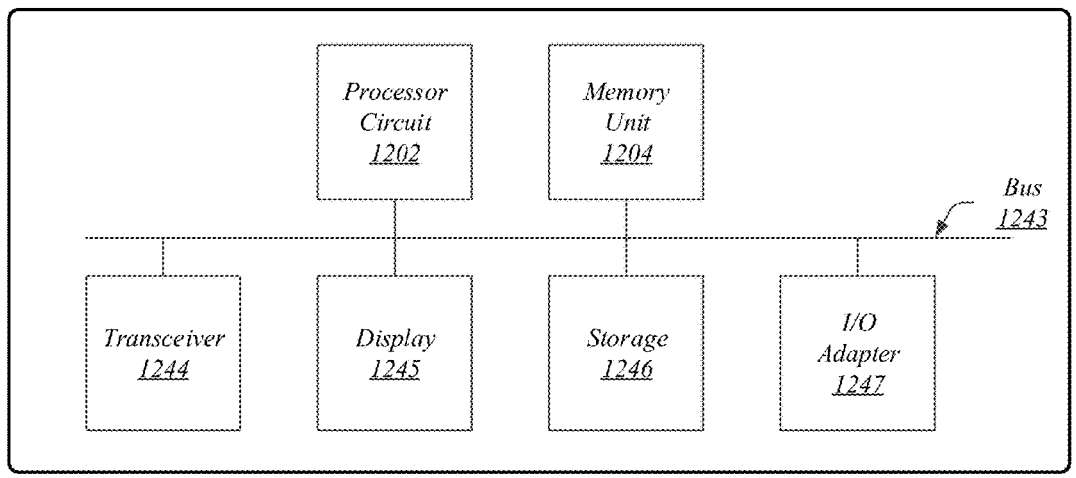
FIG. 12 illustrates an embodiment of a system.

FIG. 12 illustrates one embodiment of a system 1200. In various embodiments, system 1200 may be representative of a system or architecture suitable for use with one or more embodiments described herein, such as one or more of apparatus 100, apparatus 300, and apparatus 600. The embodiments are not limited in this respect.

As shown in FIG. 12, system 1200 may include multiple elements. One or more elements may be implemented using one or more circuits, components, registers, processors, software subroutines, modules, or any combination thereof, as desired for a given set of design or performance constraints. Although FIG. 12 shows a limited number of elements in a certain topology by way of example, it can be appreciated that more or less elements in any suitable topology may be used in system 1200 as desired for a given implementation. The embodiments are not limited in this context.

In various embodiments, system 1200 may include a processor circuit 1202. Processor circuit 1202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 1202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited to these examples.

In one embodiment, system 1200 may include a memory unit 1204 to couple to processor circuit 1202. Memory unit 1204 may be coupled to processor circuit 1202 via communications bus 1243, or by a dedicated communications bus between processor circuit 1202 and memory unit 1204, as desired for a given implementation. Memory unit 1204 may be implemented using any machine-readable or computer-readable media capable of storing data, including both volatile and non-volatile memory. For example, memory unit 1204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 1204 may be included on the same integrated circuit as processor circuit 1202, or alternatively some portion or all of memory unit 1204 may be disposed on an integrated circuit or other medium, for example a hard disk drive, that is external to the integrated circuit of processor circuit 1202. Although memory unit 1204 is comprised within system 1200 in FIG. 12, memory unit 1204 may be external to system 1200 in some embodiments. In some embodiments, memory unit 1204 may comprise non-transitory machine-readable or computer-readable media. The embodiments are not limited in this context.

In various embodiments, system 1200 may include a radio frequency (RF) transceiver 1244. RF transceiver 1244 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 1244 may operate in accordance with one or more applicable standards in any version. The embodiments are not limited in this context.

In various embodiments, system 1200 may include a display 1245. Display 1245 may comprise any display device capable of displaying information received from processor circuit 1202. Examples for display 1245 may include a television, a monitor, a projector, and a computer screen. In one embodiment, for example, display 1245 may be implemented by a liquid crystal display (LCD), light emitting diode (LED) or other type of suitable visual interface. Display 1245 may comprise, for example, a touch-sensitive display screen ("touchscreen"). In various implementations, display 1245 may comprise one or more thin-film transistors (TFT) LCD including embedded transistors. In some embodiments, display 1245 may comprise foldable display, such as foldable display 602. The embodiments are not limited in this context.

In various embodiments, system 1200 may include storage 1246. Storage 1246 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1246 may include technology to increase the storage performance enhanced protection for valuable digital media when multiple hard drives are included, for example. Further examples of storage 1246 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1200 may include one or more I/O adapters 1247. Examples of I/O adapters 1247 may include Universal Serial Bus (USB) ports/adapters, IEEE 1394 Firewire ports/adapters, and so forth. The embodiments are not limited in this context.

Figure 13:
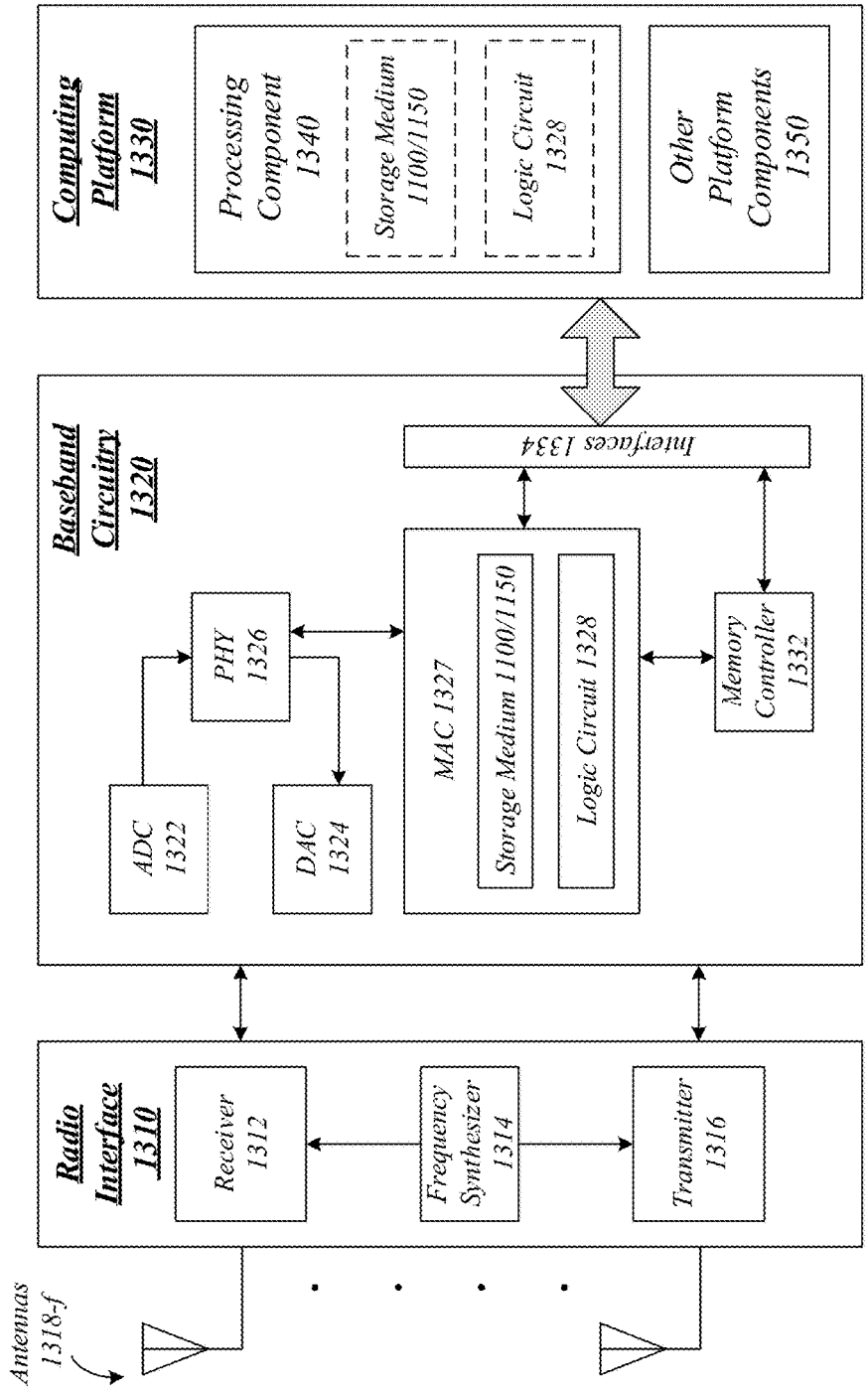
FIG. 13 illustrates an embodiment of a device.

FIG. 13 illustrates an embodiment of a communications device 1300 that may implement one or more of apparatus 100, apparatus 300, apparatus 600, storage medium 1100, storage medium 1150, and system 1200. In various embodiments, device 1300 may comprise a logic circuit 1328. The logic circuit 1328 may include physical circuits to perform operations described for one or more of apparatus 100, apparatus 300, apparatus 600, and system 1200, for example. As shown in FIG. 13, device 1300 may include a radio interface 1310, baseband circuitry 1320, and computing platform 1330, although the embodiments are not limited to this configuration.

The device 1300 may implement some or all of the structure and/or operations for one or more of apparatus 100, apparatus 300, apparatus 600, storage medium 1100, storage medium 1150, system 1200, and logic circuit 1328 in a single computing entity, such as entirely within a single device. Alternatively, the device 1300 may distribute portions of the structure and/or operations for one or more of apparatus 100, apparatus 300, apparatus 600, storage medium 1100, storage medium 1150, system 1200, and logic circuit 1328 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1310 may include, for example, a receiver 1312, a frequency synthesizer 1314, and/or a transmitter 1316. Radio interface 1310 may include bias controls, a crystal oscillator and/or one or more antennas 1318-*f*. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, a mixer for down-converting received RF signals, an analog-to-digital converter 1322 for converting analog signals to digital form, a digital-to-analog converter 1324 for converting digital signals to analog form, and a mixer for up-converting signals for transmission. Further, baseband circuitry 1320 may include a baseband or physical layer (PHY) processing circuit 1326 for PHY link layer processing of respective receive/transmit signals. Baseband circuitry 1320 may include, for example, a medium access control (MAC) processing circuit 1327 for MAC/data link layer processing. Baseband circuitry 1320 may include a memory controller 1332 for communicating with MAC processing circuit 1327 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames. Alternatively or in addition, MAC processing circuit 1327 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for one or more of apparatus 100, apparatus 300, apparatus 600, storage medium 1100, storage medium 1150, system 1200, and logic circuit 1328 using the processing component 1340. The processing component 1340 (and/or PHY 1326 and/or MAC 1327) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired.

Embodiments of device 1300 may be implemented using single input single output (SISO) architectures. However, certain implementations may include multiple antennas (e.g., antennas 1318-*f*) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 14:
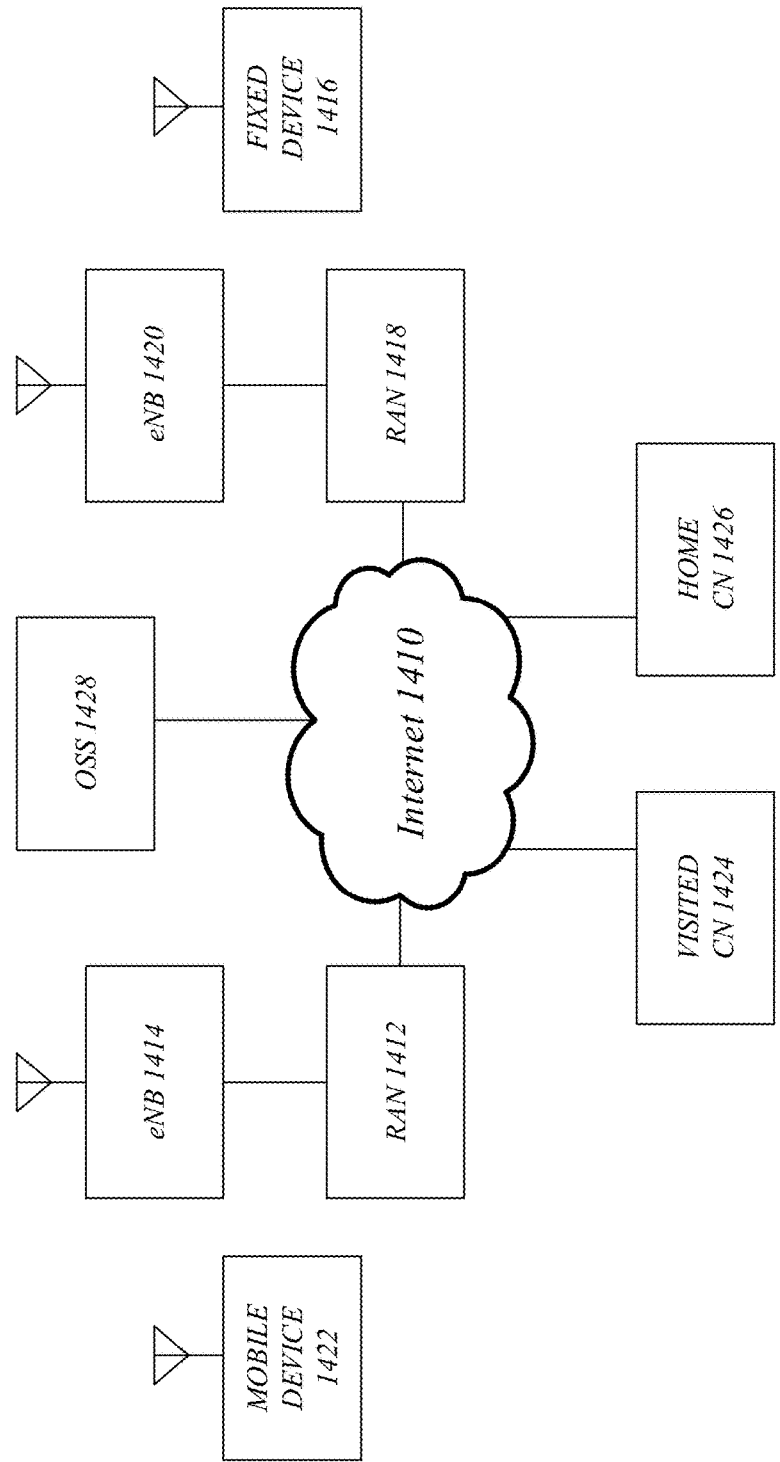
FIG. 14 illustrates an embodiment of a wireless network.

FIG. 14 illustrates an embodiment of a broadband wireless access system 1400. As shown in FIG. 14, broadband wireless access system 1400 may be an internet protocol (IP) type network comprising an internet 1410 type network or the like that is capable of supporting mobile wireless access and/or fixed wireless access to internet 1410. In one or more embodiments, broadband wireless access system 1400 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1400, radio access networks (RANs) 1412 and 1418 are capable of coupling with evolved node Bs (eNBs) 1414 and 1420, respectively, to provide wireless communication between one or more fixed devices 1416 and internet 1410 and/or between or one or more mobile devices 1422 and Internet 1410. One example of a fixed device 1416 and a mobile device 1422 is device 1300 of FIG. 13, with the fixed device 1416 comprising a stationary version of device 1300 and the mobile device 1422 comprising a mobile version of device 1300. RANs 1412 and 1418 may implement profiles that are capable of defining the mapping of network functions to one or more physical entities on broadband wireless access system 1400. eNBs 1414 and 1420 may comprise radio equipment to provide RF communication with fixed device 1416 and/or mobile device 1422, such as described with reference to device 1300, and may comprise, for example, the PHY and MAC layer equipment in compliance with a 3GPP LTE Specification or an IEEE 802.16 Standard. eNBs 1414 and 1420 may further comprise an IP backplane to couple to Internet 1410 via RANs 1412 and 1418, respectively, although the scope of the claimed subject matter is not limited in these respects.

Broadband wireless access system 1400 may further comprise a visited core network (CN) 1424 and/or a home CN 1426, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1424 and/or home CN 1426, and the scope of the claimed subject matter is not limited in these respects. Visited CN 1424 may be referred to as a visited CN in the case where visited CN 1424 is not part of the regular service provider of fixed device 1416 or mobile device 1422, for example where fixed device 1416 or mobile device 1422 is roaming away from its respective home CN 1426, or where broadband wireless access system 1400 is part of the regular service provider of fixed device 1416 or mobile device 1422 but where broadband wireless access system 1400 may be in another location or state that is not the main or home location of fixed device 1416 or mobile device 1422. The embodiments are not limited in this context.

Fixed device 1416 may be located anywhere within range of one or both of eNBs 1414 and 1420, such as in or near a home or business to provide home or business customer broadband access to Internet 1410 via eNBs 1414 and 1420 and RANs 1412 and 1418, respectively, and home CN 1426. It is worthy of note that although fixed device 1416 is generally disposed in a stationary location, it may be moved to different locations as needed. Mobile device 1422 may be utilized at one or more locations if mobile device 1422 is within range of one or both of eNBs 1414 and 1420, for example. In accordance with one or more embodiments, operation support system (OSS) 1428 may be part of broadband wireless access system 1400 to provide management functions for broadband wireless access system 1400 and to provide interfaces between functional entities of broadband wireless access system 1400. Broadband wireless access system 1400 of FIG. 14 is merely one type of wireless network showing a certain number of the components of broadband wireless access system 1400, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory, and logic, at least a portion of which is implemented in circuitry coupled to the memory, the logic to identify a use state of a display segment of a flexible display, determine whether to alter a power state of the display segment based on the use state of the display segment, and in response to a determination to alter the power state of the display segment, send a power control command to cause the display segment to initiate a power state transition.

Example 2 is the apparatus of Example 1, the logic to send the power control command to cause the display segment to transition from a standard-power operating state to a reduced-power operating state in response to a determination that the use state of the display segment has changed from a used state to an unused state.

Example 3 is the apparatus of Example 1, the logic to send the power control command to cause the display segment to transition from a reduced-power operating state to a standard-power operating state in response to a determination that the use state of the display segment has changed from an unused state to a used state.

Example 4 is the apparatus of any of Examples 1 to 3, the logic to send the power control command to drive circuitry of the display segment.

Example 5 is the apparatus of any of Examples 1 to 4, the logic to send the power control command via a display interface.

Example 6 is the apparatus of Example 5, the power control command to be comprised in a packet sent over the display interface.

Example 7 is the apparatus of Example 6, the logic to send the packet during a vertical blanking interval.

Example 8 is the apparatus of Example 5, the logic to send the power control command by causing a violation of an electrical signaling protocol for differential signaling over the display interface.

Example 9 is the apparatus of Example 5, the logic to send the power control command by causing a violation of an encoding protocol for encoding of graphics data communicated over the display interface.

Example 10 is the apparatus of Example 9, the encoding protocol to comprise an 8b/10b encoding protocol.

Example 11 is the apparatus of any of Examples 5 to 10, the display interface to comprise an Embedded DisplayPort (eDP) interface.

Example 12 is the apparatus of Example 11, the power control command to be comprised in a packet sent over a data lane of the eDP interface.

Example 13 is the apparatus of Example 12, the packet to comprise a secondary data packet (SDP).

Example 14 is the apparatus of any of Examples 1 to 4, the logic to send the power control command using sideband signaling.

Example 15 is the apparatus of Example 14, the sideband signaling to comprise general purpose input/output (GPIO) signaling.

Example 16 is the apparatus of any of Examples 1 to 15, the logic to identify the use state of the display segment based on received sense signals.

Example 17 is the apparatus of Example 16, the sense signals to be received from a sensory subsystem.

Example 18 is the apparatus of any of Examples 16 to 17, the sense signals to indicate whether the display segment is folded behind one or more other display segments of the flexible display.

Example 19 is the apparatus of any of Examples 1 to 18, the display segment to comprise a display panel.

Example 20 is a system, comprising an apparatus according to any of Examples 1 to 19, a radio interface, and at least one radio frequency (RF) antenna.

Example 21 is an apparatus, comprising at least one memory, and logic, at least a portion of which is implemented in drive circuitry for a display segment of a foldable display, the drive circuitry coupled to the memory, the logic to detect a received power control command during operation of the drive circuitry according to a standard-power operating state, and in response to detection of the power control command, initiate a power state transition to cause the drive circuitry to operate according to a reduced-power operating state.

Example 22 is the apparatus of Example 21, the initiation of the power state transition to cause the drive circuitry to power down pixel formatting circuitry comprised among the drive circuitry.

Example 23 is the apparatus of any of Examples 21 to 22, the initiation of the power state transition to cause the drive circuitry to power down column driver circuitry comprised among the drive circuitry.

Example 24 is the apparatus of any of Examples 21 to 23, the initiation of the power state transition to cause the drive circuitry to power down timing circuitry comprised among the drive circuitry.

Example 25 is the apparatus of Example 24, the timing circuitry to comprise a phase-locked loop (PLL).

Example 26 is the apparatus of any of Examples 21 to 25, the initiation of the power state transition to cause the drive circuitry to power down receive circuitry comprised among the drive circuitry.

Example 27 is the apparatus of any of Examples 21 to 26, the power control command received from a graphics source.

Example 28 is the apparatus of Example 27, the power control command received from the graphics source via a display interface.

Example 29 is the apparatus of Example 28, the power control command to be comprised in a packet received via the display interface.

Example 30 is the apparatus of Example 29, the packet received during a vertical blanking interval.

Example 31 is the apparatus of Example 28, the logic to detect the power control command by detecting a violation of an electrical signaling protocol for differential signaling over the display interface.

Example 32 is the apparatus of Example 28, the logic to detect the power control command by detecting a violation of an encoding protocol for encoding of graphics data communicated over the display interface.

Example 33 is the apparatus of Example 32, the encoding protocol to comprise an 8b/10b encoding protocol.

Example 34 is the apparatus of any of Examples 28 to 33, the display interface to comprise an Embedded DisplayPort (eDP) interface.

Example 35 is the apparatus of Example 34, the power control command to be comprised in a packet received via a data lane of the eDP interface.

Example 36 is the apparatus of Example 35, the packet to comprise a secondary data packet (SDP).

Example 37 is the apparatus of Example 27, the power control command to be received from the graphics source via sideband signaling.

Example 38 is the apparatus of Example 37, the sideband signaling to comprise general purpose input/output (GPIO) signaling.

Example 39 is the apparatus of any of Examples 27 to 38, the graphics source to comprise a system-on-a-chip (SoC).

Example 40 is the apparatus of any of Examples 27 to 38, the graphics source to comprise a graphics processing unit (GPU).

Example 41 is a display panel, comprising an apparatus according to any of Examples 21 to 40.

Example 42 is a system, comprising a display including the display panel of Example 41, a radio interface, and at least one radio frequency (RF) antenna.

Example 43 is a system, comprising a foldable display, and a graphics source to generate graphics data for transmission to the foldable display via a display interface, the graphics source to identify a use state of a display segment of the foldable display, determine whether to alter a power state of the display segment based on the use state of the display segment, and in response to a determination to alter the power state of the display segment, send a power control command to cause the display segment to initiate a power state transition.

Example 44 is the system of Example 43, the graphics source to send the power control command to cause the display segment to transition from a standard-power operating state to a reduced-power operating state in response to a determination that the use state of the display segment has changed from a used state to an unused state.

Example 45 is the system of Example 43, the graphics source to send the power control command to cause the display segment to transition from a reduced-power operating state to a standard-power operating state in response to a determination that the use state of the display segment has changed from an unused state to a used state.

Example 46 is the system of any of Examples 43 to 45, the graphics source to send the power control command to drive circuitry of the display segment.

Example 47 is the system of any of Examples 43 to 46, the graphics source to send the power control command via the display interface.

Example 48 is the system of Example 47, the power control command to be comprised in a packet sent over the display interface.

Example 49 is the system of Example 48, the graphics source to send the packet during a vertical blanking interval.

Example 50 is the system of Example 47, the graphics source to send the power control command by causing a violation of an electrical signaling protocol for differential signaling over the display interface.

Example 51 is the system of Example 47, the graphics source to send the power control command by causing a violation of an encoding protocol for encoding of graphics data communicated over the display interface.

Example 52 is the system of Example 51, the encoding protocol to comprise an 8b/10b encoding protocol.

Example 53 is the system of any of Examples 43 to 52, the display interface to comprise an Embedded DisplayPort (eDP) interface.

Example 54 is the system of Example 53, the power control command to be comprised in a packet sent over a data lane of the eDP interface.

Example 55 is the system of Example 54, the packet to comprise a secondary data packet (SDP).

Example 56 is the system of any of Examples 43 to 46, the graphics source to send the power control command using sideband signaling.

Example 57 is the system of Example 56, the sideband signaling to comprise general purpose input/output (GPIO) signaling.

Example 58 is the system of any of Examples 43 to 57, the graphics source to identify the use state of the display segment based on received sense signals.

Example 59 is the system of Example 58, the sense signals to be received from a sensory subsystem.

Example 60 is the system of any of Examples 58 to 59, the sense signals to indicate whether the display segment is folded behind one or more other display segments of the flexible display.

Example 61 is the system of any of Examples 43 to 60, the display segment to comprise a display panel.

Example 62 is the system of any of Examples 43 to 61, the graphics source to comprise a system-on-a-chip (SoC).

Example 63 is the system of any of Examples 43 to 61, the graphics source to comprise a graphics processing unit (GPU).

Example 64 is the system of any of Examples 43 to 63, comprising a radio interface, and at least one radio frequency (RF) antenna.

Example 65 is at least one non-transitory computer-readable storage medium, comprising a set of instructions that, in response to being executed by a graphics source, cause the graphics source to identify a use state of a display segment of a flexible display, determine whether to alter a power state of the display segment based on the use state of the display segment, and in response to a determination to alter the power state of the display segment, send a power control command to cause the display segment to initiate a power state transition.

Example 66 is the at least one non-transitory computer-readable storage medium of Example 65, comprising instructions that, in response to being executed by the graphics source, cause the graphics source to send the power control command to cause the display segment to transition from a standard-power operating state to a reduced-power operating state in response to a determination that the use state of the display segment has changed from a used state to an unused state.

Example 67 is the at least one non-transitory computer-readable storage medium of Example 65, comprising instructions that, in response to being executed by the graphics source, cause the graphics source to send the power control command to cause the display segment to transition from a reduced-power operating state to a standard-power operating state in response to a determination that the use state of the display segment has changed from an unused state to a used state.

Example 68 is the at least one non-transitory computer-readable storage medium of any of Examples 65 to 67, comprising instructions that, in response to being executed by the graphics source, cause the graphics source to send the power control command to drive circuitry of the display segment.

Example 69 is the at least one non-transitory computer-readable storage medium of any of Examples 65 to 68, comprising instructions that, in response to being executed by the graphics source, cause the graphics source to send the power control command via a display interface.

Example 70 is the at least one non-transitory computer-readable storage medium of Example 69, the power control command to be comprised in a packet sent over the display interface.

Example 71 is the at least one non-transitory computer-readable storage medium of Example 70, comprising instructions that, in response to being executed by the graphics source, cause the graphics source to send the packet during a vertical blanking interval.

Example 72 is the at least one non-transitory computer-readable storage medium of Example 69, comprising instructions that, in response to being executed by the graphics source, cause the graphics source to send the power control command by causing a violation of an electrical signaling protocol for differential signaling over the display interface.

Example 73 is the at least one non-transitory computer-readable storage medium of Example 69, comprising instructions that, in response to being executed by the graphics source, cause the graphics source to send the power control command by causing a violation of an encoding protocol for encoding of graphics data communicated over the display interface.

Example 74 is the at least one non-transitory computer-readable storage medium of Example 73, the encoding protocol to comprise an 8b/10b encoding protocol.

Example 75 is the at least one non-transitory computer-readable storage medium of any of Examples 69 to 74, the display interface to comprise an Embedded DisplayPort (eDP) interface.

Example 76 is the at least one non-transitory computer-readable storage medium of Example 75, the power control command to be comprised in a packet sent over a data lane of the eDP interface.

Example 77 is the at least one non-transitory computer-readable storage medium of Example 76, the packet to comprise a secondary data packet (SDP).

Example 78 is the at least one non-transitory computer-readable storage medium of any of Examples 65 to 68, comprising instructions that, in response to being executed by the graphics source, cause the graphics source to send the power control command using sideband signaling.

Example 79 is the at least one non-transitory computer-readable storage medium of Example 78, the sideband signaling to comprise general purpose input/output (GPIO) signaling.

Example 80 is the at least one non-transitory computer-readable storage medium of any of Examples 65 to 79, comprising instructions that, in response to being executed by the graphics source, cause the graphics source to identify the use state of the display segment based on received sense signals.

Example 81 is the at least one non-transitory computer-readable storage medium of Example 80, the sense signals to be received from a sensory subsystem.

Example 82 is the at least one non-transitory computer-readable storage medium of any of Examples 80 to 81, the sense signals to indicate whether the display segment is folded behind one or more other display segments of the flexible display.

Example 83 is the at least one non-transitory computer-readable storage medium of any of Examples 65 to 82, the display segment to comprise a display panel.

Example 84 is at least one non-transitory computer-readable storage medium, comprising a set of instructions that, in response to being executed by drive circuitry for a display segment of a foldable display, cause the drive circuitry to detect a received power control command during operation of the drive circuitry according to a standard-power operating state, and in response to detection of the power control command, initiate a power state transition to cause the drive circuitry to operate according to a reduced-power operating state.

Example 85 is the at least one non-transitory computer-readable storage medium of Example 84, the initiation of the power state transition to cause the drive circuitry to power down pixel formatting circuitry comprised among the drive circuitry.

Example 86 is the at least one non-transitory computer-readable storage medium of any of Examples 84 to 85, the initiation of the power state transition to cause the drive circuitry to power down column driver circuitry comprised among the drive circuitry.

Example 87 is the at least one non-transitory computer-readable storage medium of any of Examples 84 to 86, the initiation of the power state transition to cause the drive circuitry to power down timing circuitry comprised among the drive circuitry.

Example 88 is the at least one non-transitory computer-readable storage medium of Example 87, the timing circuitry to comprise a phase-locked loop (PLL).

Example 89 is the at least one non-transitory computer-readable storage medium of any of Examples 84 to 88, the initiation of the power state transition to cause the drive circuitry to power down receive circuitry comprised among the drive circuitry.

Example 90 is the at least one non-transitory computer-readable storage medium of any of Examples 84 to 89, the power control command received from a graphics source.

Example 91 is the at least one non-transitory computer-readable storage medium of Example 90, the power control command received from the graphics source via a display interface.

Example 92 is the at least one non-transitory computer-readable storage medium of Example 91, the power control command to be comprised in a packet received via the display interface.

Example 93 is the at least one non-transitory computer-readable storage medium of Example 92, the packet received during a vertical blanking interval.

Example 94 is the at least one non-transitory computer-readable storage medium of Example 91, comprising instructions that, in response to being executed by the drive circuitry, cause the drive circuitry to detect the power control command by detecting a violation of an electrical signaling protocol for differential signaling over the display interface.

Example 95 is the at least one non-transitory computer-readable storage medium of Example 91, comprising instructions that, in response to being executed by the drive circuitry, cause the drive circuitry to detect the power control command by detecting a violation of an encoding protocol for encoding of graphics data communicated over the display interface.

Example 96 is the at least one non-transitory computer-readable storage medium of Example 95, the encoding protocol to comprise an 8b/10b encoding protocol.

Example 97 is the at least one non-transitory computer-readable storage medium of any of Examples 91 to 96, the display interface to comprise an Embedded DisplayPort (eDP) interface.

Example 98 is the at least one non-transitory computer-readable storage medium of Example 97, the power control command to be comprised in a packet received via a data lane of the eDP interface.

Example 99 is the at least one non-transitory computer-readable storage medium of Example 98, the packet to comprise a secondary data packet (SDP).

Example 100 is the at least one non-transitory computer-readable storage medium of Example 90, the power control command to be received from the graphics source via sideband signaling.

Example 101 is the at least one non-transitory computer-readable storage medium of Example 100, the sideband signaling to comprise general purpose input/output (GPIO) signaling.

Example 102 is the at least one non-transitory computer-readable storage medium of any of Examples 90 to 101, the graphics source to comprise a system-on-a-chip (SoC).

Example 103 is the at least one non-transitory computer-readable storage medium of any of Examples 90 to 101, the graphics source to comprise a graphics processing unit (GPU).

Example 104 is a method, comprising identifying, by a graphics source, a use state of a display segment of a flexible display, determining whether to alter a power state of the display segment based on the use state of the display segment, and in response to a determination to alter the power state of the display segment, sending a power control command to cause the display segment to initiate a power state transition.

Example 105 is the method of Example 104, comprising sending the power control command to cause the display segment to transition from a standard-power operating state to a reduced-power operating state in response to a determination that the use state of the display segment has changed from a used state to an unused state.

Example 106 is the method of Example 104, comprising sending the power control command to cause the display segment to transition from a reduced-power operating state to a standard-power operating state in response to a determination that the use state of the display segment has changed from an unused state to a used state.

Example 107 is the method of any of Examples 104 to 106, comprising sending the power control command to drive circuitry of the display segment.

Example 108 is the method of any of Examples 104 to 107, comprising sending the power control command via a display interface.

Example 109 is the method of Example 108, the power control command to be comprised in a packet sent over the display interface.

Example 110 is the method of Example 109, comprising sending the packet during a vertical blanking interval.

Example 111 is the method of Example 108, comprising sending the power control command by causing a violation of an electrical signaling protocol for differential signaling over the display interface.

Example 112 is the method of Example 108, comprising sending the power control command by causing a violation of an encoding protocol for encoding of graphics data communicated over the display interface.

Example 113 is the method of Example 112, the encoding protocol to comprise an 8b/10b encoding protocol.

Example 114 is the method of any of Examples 108 to 113, the display interface to comprise an Embedded DisplayPort (eDP) interface.

Example 115 is the method of Example 114, the power control command to be comprised in a packet sent over a data lane of the eDP interface.

Example 116 is the method of Example 115, the packet to comprise a secondary data packet (SDP).

Example 117 is the method of any of Examples 104 to 107, comprising sending the power control command using sideband signaling.

Example 118 is the method of Example 117, the sideband signaling to comprise general purpose input/output (GPIO) signaling.

Example 119 is the method of any of Examples 104 to 118, comprising identifying the use state of the display segment based on received sense signals.

Example 120 is the method of Example 119, the sense signals to be received from a sensory subsystem.

Example 121 is the method of any of Examples 119 to 120, the sense signals to indicate whether the display segment is folded behind one or more other display segments of the flexible display.

Example 122 is the method of any of Examples 104 to 121, the display segment to comprise a display panel.

Example 123 is at least one non-transitory computer-readable storage medium, comprising a set of instructions that, in response to being executed by a graphics source, cause the graphics source to perform a method according to any of Examples 104 to 122.

Example 124 is an apparatus, comprising means for performing a method according to any of Examples 104 to 122.

Example 125 is a system, comprising the apparatus of Example 124, a radio interface, and at least one radio frequency (RF) antenna.

Example 126 is a method, comprising detecting, by drive circuitry for a display segment of a foldable display, a received power control command during operation of the drive circuitry according to a standard-power operating state, and in response to detection of the power control command, initiating a power state transition to cause the drive circuitry to operate according to a reduced-power operating state.

Example 127 is the method of Example 126, the initiation of the power state transition to cause the drive circuitry to power down pixel formatting circuitry comprised among the drive circuitry.

Example 128 is the method of any of Examples 126 to 127, the initiation of the power state transition to cause the drive circuitry to power down column driver circuitry comprised among the drive circuitry.

Example 129 is the method of any of Examples 126 to 128, the initiation of the power state transition to cause the drive circuitry to power down timing circuitry comprised among the drive circuitry.

Example 130 is the method of Example 129, the timing circuitry to comprise a phase-locked loop (PLL).

Example 131 is the method of any of Examples 126 to 130, the initiation of the power state transition to cause the drive circuitry to power down receive circuitry comprised among the drive circuitry.

Example 132 is the method of any of Examples 126 to 131, the power control command received from a graphics source.

Example 133 is the method of Example 132, the power control command received from the graphics source via a display interface.

Example 134 is the method of Example 133, the power control command to be comprised in a packet received via the display interface.

Example 135 is the method of Example 134, the packet received during a vertical blanking interval.

Example 136 is the method of Example 133, comprising detecting the power control command by detecting a violation of an electrical signaling protocol for differential signaling over the display interface.

Example 137 is the method of Example 133, comprising detecting the power control command by detecting a violation of an encoding protocol for encoding of graphics data communicated over the display interface.

Example 138 is the method of Example 137, the encoding protocol to comprise an 8b/10b encoding protocol.

Example 139 is the method of any of Examples 133 to 138, the display interface to comprise an Embedded DisplayPort (eDP) interface.

Example 140 is the method of Example 139, the power control command to be comprised in a packet received via a data lane of the eDP interface.

Example 141 is the method of Example 140, the packet to comprise a secondary data packet (SDP).

Example 142 is the method of Example 132, the power control command to be received from the graphics source via sideband signaling.

Example 143 is the method of Example 142, the sideband signaling to comprise general purpose input/output (GPIO) signaling.

Example 144 is the method of any of Examples 132 to 143, the graphics source to comprise a system-on-a-chip (SoC).

Example 145 is the method of any of Examples 132 to 143, the graphics source to comprise a graphics processing unit (GPU).

Example 146 is at least one non-transitory computer-readable storage medium, comprising a set of instructions that, in response to being executed by drive circuitry for a display segment of a foldable display, cause the drive circuitry to perform a method according to any of Examples 126 to 145.

Example 147 is an apparatus, comprising means for performing a method according to any of Examples 126 to 145.

Example 148 is a system, comprising the apparatus of Example 147, a radio interface, and at least one radio frequency (RF) antenna.

Example 149 is an apparatus, comprising means for identifying a use state of a display segment of a flexible display, means for determining whether to alter a power state of the display segment based on the use state of the display segment, and means for sending a power control command in response to a determination to alter the power state of the display segment, the power control command to cause the display segment to initiate a power state transition.

Example 150 is the apparatus of Example 149, comprising means for sending the power control command to cause the display segment to transition from a standard-power operating state to a reduced-power operating state in response to a determination that the use state of the display segment has changed from a used state to an unused state.

Example 151 is the apparatus of Example 149, comprising means for sending the power control command to cause the display segment to transition from a reduced-power operating state to a standard-power operating state in response to a determination that the use state of the display segment has changed from an unused state to a used state.

Example 152 is the apparatus of any of Examples 149 to 151, comprising means for sending the power control command to drive circuitry of the display segment.

Example 153 is the apparatus of any of Examples 149 to 152, comprising means for sending the power control command via a display interface.

Example 154 is the apparatus of Example 153, the power control command to be comprised in a packet sent over the display interface.

Example 155 is the apparatus of Example 154, comprising means for sending the packet during a vertical blanking interval.

Example 156 is the apparatus of Example 153, comprising means for sending the power control command by causing a violation of an electrical signaling protocol for differential signaling over the display interface.

Example 157 is the apparatus of Example 153, comprising means for sending the power control command by causing a violation of an encoding protocol for encoding of graphics data communicated over the display interface.

Example 158 is the apparatus of Example 157, the encoding protocol to comprise an 8b/10b encoding protocol.

Example 159 is the apparatus of any of Examples 153 to 158, the display interface to comprise an Embedded DisplayPort (eDP) interface.

Example 160 is the apparatus of Example 159, the power control command to be comprised in a packet sent over a data lane of the eDP interface.

Example 161 is the apparatus of Example 160, the packet to comprise a secondary data packet (SDP).

Example 162 is the apparatus of any of Examples 149 to 152, comprising means for sending the power control command using sideband signaling.

Example 163 is the apparatus of Example 162, the sideband signaling to comprise general purpose input/output (GPIO) signaling.

Example 164 is the apparatus of any of Examples 149 to 163, comprising means for identifying the use state of the display segment based on received sense signals.

Example 165 is the apparatus of Example 164, the sense signals to be received from a sensory subsystem.

Example 166 is the apparatus of any of Examples 164 to 165, the sense signals to indicate whether the display segment is folded behind one or more other display segments of the flexible display.

Example 167 is the apparatus of any of Examples 149 to 166, the display segment to comprise a display panel.

Example 168 is a system, comprising an apparatus according to any of Examples 149 to 167, a radio interface, and at least one radio frequency (RF) antenna.

Example 169 is an apparatus, comprising means for detecting a received power control command during operation of drive circuitry of a display segment of a foldable display according to a standard-power operating state, and means for initiation a power state transition in response to detection of the power control command, the initiation of the power state transition to cause the drive circuitry to operate according to a reduced-power operating state.

Example 170 is the apparatus of Example 169, the initiation of the power state transition to cause the drive circuitry to power down pixel formatting circuitry comprised among the drive circuitry.

Example 171 is the apparatus of any of Examples 169 to 170, the initiation of the power state transition to cause the drive circuitry to power down column driver circuitry comprised among the drive circuitry.

Example 172 is the apparatus of any of Examples 169 to 171, the initiation of the power state transition to cause the drive circuitry to power down timing circuitry comprised among the drive circuitry.

Example 173 is the apparatus of Example 172, the timing circuitry to comprise a phase-locked loop (PLL).

Example 174 is the apparatus of any of Examples 169 to 173, the initiation of the power state transition to cause the drive circuitry to power down receive circuitry comprised among the drive circuitry.

Example 175 is the apparatus of any of Examples 169 to 174, the power control command received from a graphics source.

Example 176 is the apparatus of Example 175, the power control command received from the graphics source via a display interface.

Example 177 is the apparatus of Example 176, the power control command to be comprised in a packet received via the display interface.

Example 178 is the apparatus of Example 177, the packet received during a vertical blanking interval.

Example 179 is the apparatus of Example 176, comprising means for detecting the power control command by detecting a violation of an electrical signaling protocol for differential signaling over the display interface.

Example 180 is the apparatus of Example 176, comprising means for detecting the power control command by detecting a violation of an encoding protocol for encoding of graphics data communicated over the display interface.

Example 181 is the apparatus of Example 180, the encoding protocol to comprise an 8b/10b encoding protocol.

Example 182 is the apparatus of any of Examples 176 to 181, the display interface to comprise an Embedded DisplayPort (eDP) interface.

Example 183 is the apparatus of Example 182, the power control command to be comprised in a packet received via a data lane of the eDP interface.

Example 184 is the apparatus of Example 183, the packet to comprise a secondary data packet (SDP).

Example 185 is the apparatus of Example 175, the power control command to be received from the graphics source via sideband signaling.

Example 186 is the apparatus of Example 185, the sideband signaling to comprise general purpose input/output (GPIO) signaling.

Example 187 is the apparatus of any of Examples 175 to 186, the graphics source to comprise a system-on-a-chip (SoC).

Example 188 is the apparatus of any of Examples 175 to 186, the graphics source to comprise a graphics processing unit (GPU).

Example 189 is a system, comprising an apparatus according to any of Examples 169 to 188, a radio interface, and at least one radio frequency (RF) antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic, at least a portion of which is implemented in circuitry coupled to the memory, the logic to:
     identify a use state of a display segment of a flexible display;
     determine whether to alter a power state of the display segment based on the use state of the display segment; and
     in response to a determination to alter the power state of the display segment, cause at least one of a violation of an electrical signaling protocol for differential signaling over a display interface or a violation of an encoding protocol for encoding of graphics data communicated over the display interface to send a power control command to cause the display segment to initiate a power state transition.

2. The apparatus of claim 1, the logic to send the power control command to cause the display segment to transition from a standard-power operating state to a reduced-power operating state in response to a determination that the use state of the display segment has changed from a used state to an unused state.

3. The apparatus of claim 1, the logic to send the power control command to cause the display segment to transition from a reduced-power operating state to a standard-power operating state in response to a determination that the use state of the display segment has changed from an unused state to a used state.

4. The apparatus of claim 1, the power control command to be comprised in a packet sent over the display interface.

5. The apparatus of claim 1, the logic to identify the use state of the display segment based on received sense signals.

6. An apparatus, comprising:
   at least one memory; and
   logic, at least a portion of which is implemented in drive circuitry for a display segment of a foldable display, the drive circuitry coupled to the memory, the logic to:
     detect at least one of a violation of an electrical signaling protocol for differential signaling over a display interface or a violation of an encoding protocol for encoding of graphics data communicated over the display interface;
     detect, based on detecting at least one of the violations, a received power control command during operation of the drive circuitry according to a standard-power operating state, the power control command to be received from a graphics source via the display interface; and
     in response to detection of the power control command, initiate a power state transition to cause the drive circuitry to operate according to a reduced-power operating state.

7. The apparatus of claim 6, the initiation of the power state transition to cause the drive circuitry to power down pixel formatting circuitry comprised among the drive circuitry.

8. The apparatus of claim 6, the initiation of the power state transition to cause the drive circuitry to power down column driver circuitry comprised among the drive circuitry.

9. The apparatus of claim 6, the initiation of the power state transition to cause the drive circuitry to power down timing circuitry comprised among the drive circuitry.

10. The apparatus of claim 6, the power control command to be comprised in a packet received from the graphics source via the display interface.

11. The apparatus of claim 6, the power control command to be received from the graphics source via sideband signaling.

12. A system, comprising:
    a foldable display; and
    a graphics source to generate graphics data for transmission to the foldable display via a display interface, the graphics source to:
      identify a use state of a display segment of the foldable display; determine whether to alter a power state of the display segment based on the use state of the display segment; and
      in response to a determination to alter the power state of the display segment, cause at least one of a violation of an electrical signaling protocol for differential signaling over a display interface or a violation of an encoding protocol for encoding of graphics data communicated over the display interface to send a power control command to cause the display segment to initiate a power state transition.

13. The system of claim 12, the graphics source to send the power control command to cause the display segment to transition from a standard-power operating state to a reduced-power operating state in response to a determination that the use state of the display segment has changed from a used state to an unused state.

14. The system of claim 12, the graphics source to send the power control command to cause the display segment to transition from a reduced-power operating state to a standard-power operating state in response to a determination that the use state of the display segment has changed from an unused state to a used state.

15. The system of claim 12, the power control command to be comprised in a packet sent over the display interface.

16. The system of claim 12, the display interface to comprise an Embedded DisplayPort (eDP) interface.

\* \* \* \* \*